United States Patent [19]

Schülte

[11] Patent Number: 4,565,597

[45] Date of Patent: Jan. 21, 1986

[54] METHOD FOR PRODUCING A VENEER WEB

[75] Inventor: Gerhard Schülte, Blomberg, Fed. Rep. of Germany

[73] Assignee: Blomberger Holzindustrie, B. Hausmann GmbH & Co, KG, Blombeg, Fed. Rep. of Germany

[21] Appl. No.: 724,936

[22] Filed: Apr. 19, 1985

Related U.S. Application Data

[63] Continuation of Ser. No. 491,484, May 4, 1983, abandoned.

[30] Foreign Application Priority Data

May 6, 1982 [DE] Fed. Rep. of Germany ....... 3217063

[51] Int. Cl.[4] .............................................. B32B 31/00

[52] U.S. Cl. .................................... 156/250; 156/258; 156/264; 156/266; 156/304.5

[58] Field of Search ................. 156/64, 250, 258, 264, 156/266, 267, 304.5

[56] References Cited

U.S. PATENT DOCUMENTS

| | | | |
|---|---|---|---|
| 3,969,558 | 7/1976 | Sadashige | 156/264 |
| 3,985,169 | 10/1976 | Chow | 156/304.5 |
| 4,401,496 | 8/1983 | Koontz, Jr. | 156/266 |

FOREIGN PATENT DOCUMENTS

| | | | |
|---|---|---|---|
| 0460808 | 11/1949 | Canada | 156/266 |
| 1224023 | 9/1966 | Fed. Rep. of Germany . | |
| 1258483 | 1/1968 | Fed. Rep. of Germany . | |
| 1588301 | 9/1971 | Fed. Rep. of Germany . | |
| 2532428 | 2/1977 | Fed. Rep. of Germany . | |
| 2552710 | 5/1977 | Fed. Rep. of Germany . | |
| 173818 | 12/1934 | Switzerland . | |

OTHER PUBLICATIONS

Michael Martin, Holz und Kunststoffverarbeitung, 902, 909 (in German, 1980).

Gosshennig and Kollman, 166–284 (in German, 1962).

*Primary Examiner*—Jay H. Woo
*Assistant Examiner*—Timothy W. Heitbrink
*Attorney, Agent, or Firm*—Arnold, White & Durkee

[57] ABSTRACT

The invention relates to a method for manufacturing a veneer web composed of individual veneer strips of finite length and width which are pre-cut from a peeled veneer sheet. According to a known method, the strips are cut from the veneer sheet in random sizes, depending on the presence of faults or quality variations of the veneer sheet, whereupon they are combined in a tesselated pattern. An object of the invention is the provision of a method permitting veneer webs of practically any desired width and length to be produced in an economical manner with optimum utilization of the faultless and acceptable-quality portions of the peeled starting veneer material. To attain this object, the invention provides that the peeled veneer is cut to strips of equal width, that the absolutely non-usable strips are discarded, that the usable longitudinal sections of partially usable strips are trimmed of such strips, that the fault-free strips and the fault-free strip sections are joined to form continuous ribbons, and finally that these ribbons are joined transversely of their longitudinal direction to form a veneer web of a desired length and width.

6 Claims, 9 Drawing Figures

Figure 1A:
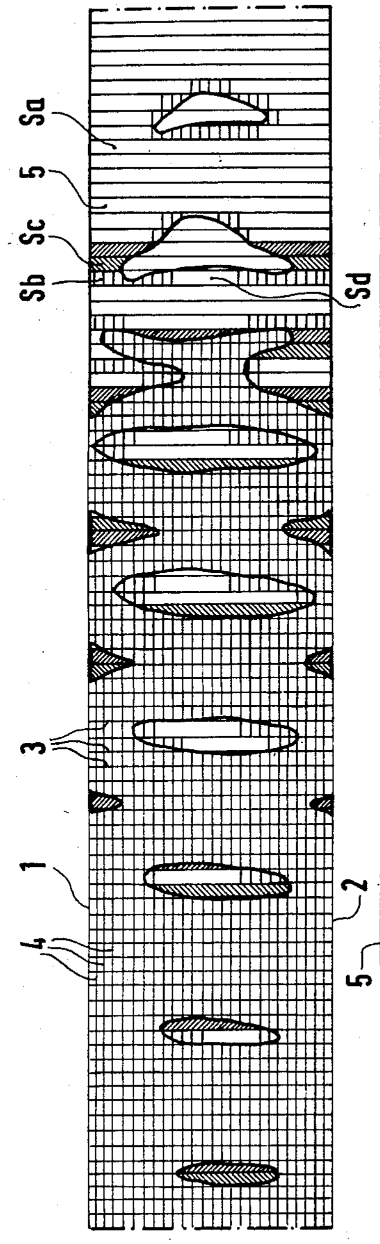

FIG. 6A
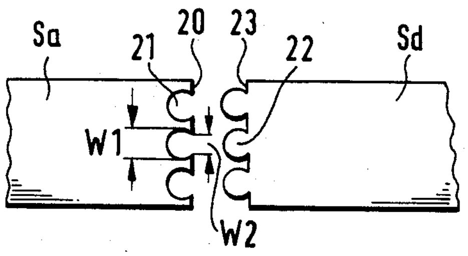
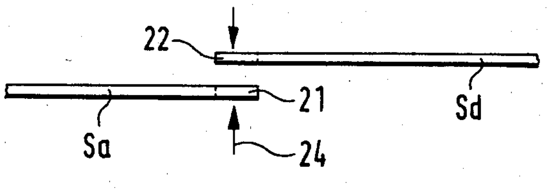
FIG. 6B

METHOD FOR PRODUCING A VENEER WEB

This is a continuation of co-pending application Ser. No. 491,484 filed on May 4, 1983, now abandoned.

The present invention relates to a method of the type set forth in the introductory clause of claim 1, and to apparatus for carrying out this method.

In generally known and practically applied methods of this type, considerable manual labour is required for cutting non-usable areas out of the raw veneer and for separating the raw veneer into veneer strips in accordance with varying quality of the veneer. This leads to the formation of strips of varying width and of veneer sections of a predetermined width as related to the width of the final product, such as full width sections, half-width sections, one third width sections etc.. A proportion of the variable-width strips includes non-usable area sections that have to be trimmed. As the thus obtained shorter sections are of non-uniform width and are thus unsuitable for being joined in the longitudinal direction, they have to be cut to standard lengths, which precludes optimum exploitation of the available veneer sheet area. The thus cut veneer strips of equal length are then initially joined transversely of the fiber direction, and subsequently cut to equal widths, according to a known method. Only then are the strips suitable for being joined in the longitudinal direction in accordance with the known method, whereafter they can be divided into suitable lengths in accordance with the desired final product. Automatization of these process steps is extremely difficult due to the non-uniformity of the veneer sections. Moreover, the necessary limitation to only a few standard lengths precludes optimum utilization of the usable veneer area.

A further qualitative problem in context with the known methods is presented by the above mentioned standard widths. Due to the inhonogeneous structure of natural wood, these widths in many cases include areas of higher and lower quality. The proportion of lower quality in a larger veneer section lowers the quality of the entire section, so that it is to be classed as low-grade veneer. To save the higher-grade portions of such section for further processing as high-quality material would require the section to be cut to strips, which is generally avoided, however, due to the considerable labour requirements of the processing of such strips in accordance with known methods. As a result, manufacturers frequently complain about a lack of high-quality veneers, while lower-grade veneers are available in large quantities, occupying storage space more urgently needed for other purposes.

If the veneer webs obtained by the known methods are employed as veneer layers for the manufacture of veneer plywood, the known methods are ridden by two scarcely avoidable risks which may lead to undesirable warping of the finished plywood plates. The first risk is due to the practically unavoidable combination of veneer layers consisting of strips with layers consisting of full widths, half-widths etc. within a single plate. This leads to a non-uniform moisture distribution within the compressed plate, which equalizes itself at a later time, resulting in the above mentioned warping of the plate. The second warping risk is likewise due to to the processing of undivided widths, which may result in warping of the plates even if employed exclusively. In this case, warping may be caused by the stresses still present in the undivided veneers as a result of growth, peeling and drying processes.

In accordance with a further known method, veneer sections obtained from relatively short raw wood blocks and having variable width due to the trimming of faulty portions are initially joined transversely to form an endless web. The web is then divided into veneer sheets of equal width, which are subsequently joined in the longitudinal direction to form an endless web. This web is cut to equal lengths in the longitudinal direction, which lengths may then again be joined transversely to form a continuous web. Apart from the fact that the problem of unsatisfactory utilization of the available wood is rather incompletely solved also by this method, as there is no indication as to the utilization of veneers having a shorter length than the raw wood block, there exist serious reservations with regard to quality, because the longitudinal joining of relatively large veneer widths necessarily leads to a weakening of the final product over large proportions in the width direction, whereby the usability of the final product is restricted. Finally, the possibility to automatize this known method is severely restricted due to the varying initial widths.

It is therefore an object of the present invention to provide a method of the type set forth in the introduction, and apparatus for carrying out this method, whereby veneer webs of any suitable length and width can be manufactured rapidly and in an economical manner.

In accordance with the invention, this object is attained by the method set forth in the characterizing clause of the main claim.

The constantly equal width of the strips intended for further processing permits the method to be carried out by means of largely automatized devices and with minimum employ of manual labour. On the other hand, the method offers the possibility to manufacture veneer webs of any suitable length and width, depending solely on the quality of the material and on the dimensions of the apparatus employed for carrying out the method. It is a further particular advantage that the method according to the invention is conducive to optimum utilization of the veneers employed as the starting material, i.e. that only such veneer areas are discarded which are non-usable for inclusion in the veneer webs. The degree of utilization of the available veneer area may be selectively determined within a wide range by properly selecting the strip width and determining the effectively usable minimum strip length.

The method according to the invention makes use of the following considerations in a simple and useful manner:

Preparatory to the manufacture of veneers, the raw wood, being a natural product with widely varying properties and faults should be divided in the growth direction, i.e. in the fiber direction in such a manner that the dividing cuts are placed with a view to quality distribution in the longitudinal direction, so as to reduce eventual losses to a minimum. In the practical execution, this is frequently opposed by the requirement to produce sections of a length determined by the dimensions of the final product, the quality of such length sections being frequently incompatible with the quality of the raw wood without incurring considerable losses. As the invention now permits the length of the veneer sections to be extended in the fiber direction, thanks to the uniform strip width, the properties of the raw wood as well as those of the final product can be equally taken into account. As the final products frequently require a distribution of certain veneer qualities not ensured by the properties of the logs used as the starting material, the mixed-quality material obtained from a log is only in part suitable for the final product of a specific type, so that a certain proportion of different qualities has to be stored for later use. If the length of the starting material is determined by the dimensions of the final product, the proportion to be stored will be of uniform length. This leads to excessive storage volumes with a large variety of different length, depending on the dimensions of each final product, as the stored material may not be used for any final product due to quality considerations. As a remedy to these drawbacks, the invention offers the economically feasible possibility of adjusting the length of the raw veneer material, so that stored material which is unsuitable for a given final product may be employed for other final products of different quality requirements. The method according to the invention is also conducive to improved utilization of the higher-grade veneer proportion obtained from a log by permitting shorter veneer sections, obtained for instance at the start of the veneer peeling operation, to be utilized independently of the dimensions of the final product. In addition, the method according to the invention permits the employ for high-grade products of strip-shaped veneer sections of higher quality originally located between areas of lower quality, while known methods usually refrained from utilizing such higher-quality strip sections, as the manual labour required for trimming such usable sections would be excessively expensive. Finally, the method according to the invention also increases the yield of higher-quality veneer by permitting numerous veneer strips, which would have to be down-graded due to a single fault, to be up-graded to a higher quality after elimination of the fault, as such sections are subsequently readjusted to the desired length. The method according to the invention likewise results in a simplification of the grading operations and of the transverse joining of the strips, as the uniform strip width and the accurately parallel edges of the strips determined by the present method permit the grading and joining steps to be automatized and to abolish any manual intervention, the result of which would anyhow be largely dependent on the sensibilty, adaptability and concentration of the operating personnel.

In view of these considerations, a further aspect of the method according to the invention as set forth in claim 2 offers further advantages. This process step deals only with effectively usable strips and strip sections differing from each other only in their quality and/or other properties. Grading of the material by these characteristics is considerably simplified as compared to former methods, since the material units to be processed are of uniform width, whereby the quality determination is simplified and automatic control of the material feed is facilitated.

A further important aspect of the method according to the invention is set forth in claim 3. Not only does this aspect permit the degree of utilization of the raw wood to be predetermined, but also the adaptation of the method according to the invention to the specific type of wood to be processed.

A further modification of the method according to the invention is disclosed in claim 4. It is obvious that a usable veneer portion having a larger area of substantially uniform quality does not have to be cut to strips that would have to be rejoined at a later stage. These larger veneer sections may rather be cut to full width or partial widths, and joined with the uniform-width veneer strips to form a veneer web of a desired width, the last-named strips having previously been prepared in accordance with the characteristics of the main claim.

A further advantageous aspect is disclosed in claim 5. According to this aspect, strips of uniform width and uniform quality, although of varying lengths, which may be introduced from storage, are joined to form a veneer web. The joining operation does not offer any problems, as the veneer strips have linear and parallel edges as a natural result of the method according to the invention.

A further important concept is embodied in claim 6. This concept offers the possibility to join veneer strips longitudinally assembled of usable and quality-graded strip sections together with full-length usable veneer strips to form a veneer strip of the desired width corresponding for instance to the original length of the strips.

A further important process step is evident from claim 7. The joining of veneer strips in the fiber direction is known, and is usually carried out in a non-positive manner such as by means of adhesives. This leads to frequent problems in the further processing stages, as the joints are not sufficiently strong, so that they may separate. The longitudinally acting interlock engagement ensures that the ribbons formed of individual strips or strip sections do not disintegrate during further processing.

The interlock engagement is preferably accomplished in accordance with claim 8, as this kind of connection between wooden veneers is technically acceptable and leads to surprisingly good results.

The method according to the invention may be carried out by various combinations of mechanical devices, the combination described in claim 9 being at present believed to be particularly well suited to practical requirements. The individual process steps are consecutively carried out on the starting material and the intermediate products, resulting in a smooth material flow at high operating speeds. The individual components of the apparatus may be installed in line or side by side in the manner of an assemby line, so that the available floor space is used in the most effective manner.

The apparatus according to claim 9 is preferably supplemented by a device disclosed in claim 10, whereby veneer webs of different, although constant qualities may be produced.

Finally, the characteristic set forth in claim 11 is also of importance, as it is conducive to a fully automatized process, in which operating personnel play a merely supervisory roll, and which leads to a high production speed for veneer webs of determinable quality.

Figure 1B:
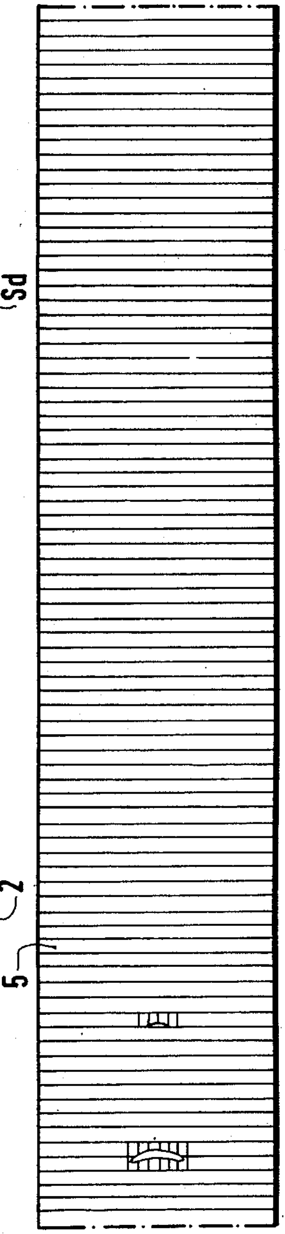
Figure 1C:
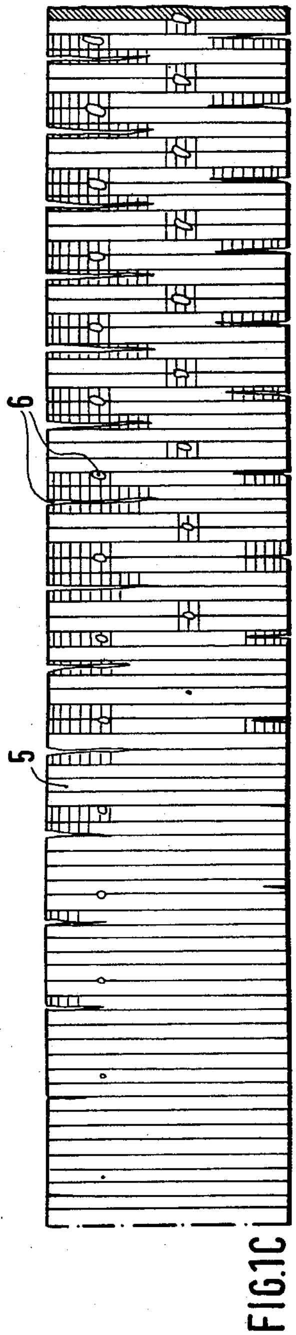
Figure 2:
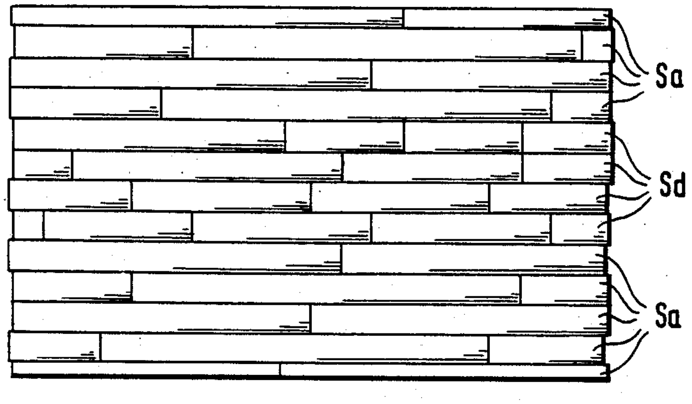
Figure 3:
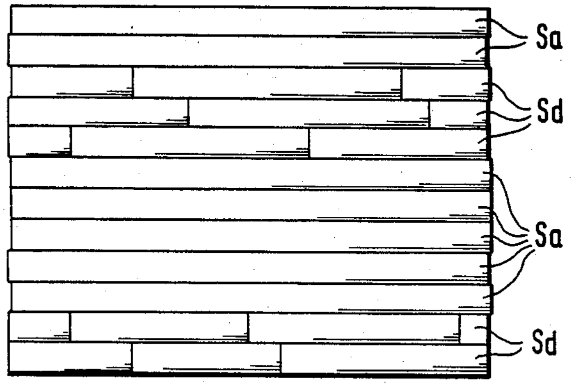
Figure 4:
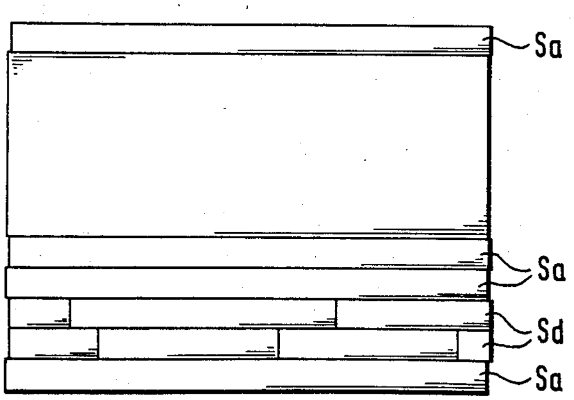
Figure 5:
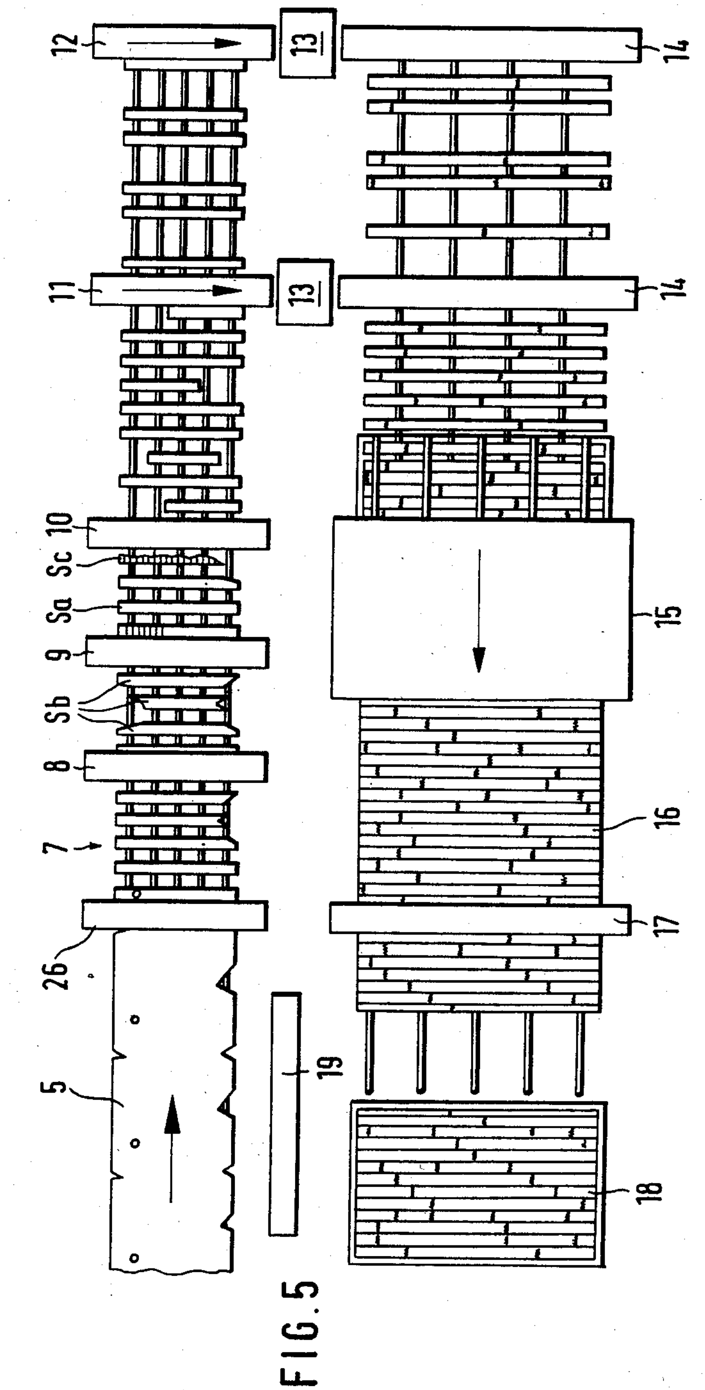

The method according to the invention shall now be further explained with reference to the accompanying drawings, wherein:

FIG. 1*a* to 1*c* show a diagrammatic view of a peeled veneer web with a superimposed grid pattern indicating the manner in which it is to be processed by the method according to the invention, FIG. 2 shows a portion of a veneer web manufactured by the method according to the invention, FIG. 3 shows a portion of a veneer web manufactured in accordance with a modification of the method according to the invention, FIG. 4 shows a portion of a veneer web according to a further modification of the invention, FIG. 5 shows a diagrammatic top plan view of an apparatus suitable for carrying out the method according to the invention, and FIG. 6a and 6b show two views of a detail involved in carrying out the method according to the invention.

FIGS. 1a to 1c show three separate portions of a peeled veneer web 5 obtained by circumferential peeling of a round log in the form of a continuous web. Indicated at 1 and 2 are the provisional longitudinal edges of the veneer web 5. Veneer web 5 is to be cut to strips of equal width along separation lines 3 extending substantially in the fiber direction. Lines 4 extending at uniform spacing transversely of the fiber direction so as to form a grid pattern are indicative of the locations at which the veneer may be cut transversely of the fiber direction.

Starting at FIG. 1a, the peeling process initially yields individual veneer portions of irregular shape, the size of which increases with each revolution, until they flow together to form a substantially continuous veneer web as shown in FIG. 1b. Towards the end of the peeling process, veneer web approaches the core portion of the log, resulting in the increasing occurrence of serious faults 6 such as large fissures and knotholes.

In accordance with the invention, veneer web 5 as well as the separate portions thereof are cut to individual strips of equal width corresponding to the spacing of lines 3, the cuts extending substantially parallel to the fiber direction. The resulting strips are of three different types, namely, strips Sa of full length in the fiber direction, part-faulty strips Sb having an effectively usable section in their longitudinal direction, and faulty strips 1c having no usable section at all along their length. In the grid pattern shown, a standard length unit, represented for instance by the distance over five lines 4, is selected as the minimum length for an effectively usable strip section Sd. Subsequently, strip sections Sd are cut from all part-faulty strips Sb, the common characteristics of these strip sections being a rectangular surface of uniform width, and at least the minimum length Sd. The faulty strips Sc and the non-usable portions of the part-faulty strips Sb may be chopped in accordance with the grid pattern and discarded. Alternatively the chopping operation may be omitted, and the faulty strips and strip sections be discarded as they are.

There remain now only strips Sa and strip sections Sd, all of which are effectively usable, without there having been made any distinction as to quality, colouring or fiber structure in the condition shown in FIGS. 1a to 1c. In practice there will nearly always be such distinction, requiring the strips to be graded so as to form several groups of substantially uniform quality of strips Sa and strip sections Sd. In FIGS. 1a to 1c, different properties of the veneer, with the exception of quality differences, are indicated by cross-hatching, plain areas indicating usable veneer. Obliquely hatched areas represent strips Sc yielding to usable veneer at all, while transversely hatched areas indicate portions of strips Sb having no continuous parallel cut edges or a length below the minimum length of strip sections Sd.

The above described method for processing veneer web 5 shall now be explained in detail with reference to FIG. 5, which shows an example of an apparatus for carrying out the invention.

In the apparatus shown in FIG. 5, the veneer web 5, which is preferably pre-dried and has preferably been obtained by a circumferential peeling process, is fed to a cutting device 26, wherein it is cut to strips Sa, Sb and Sc substantially parallel to the fiber direction. If the veneer web 5 is fed at a relatively low constant speed, the cutting operation may be performed by a stationary cutting device in timed sequence, while a higher speed would require the employ of a cutting device travelling along with the veneer during each cutting step. Alternatively, it is possible to employ a stationary cutting device in combination with accurately controlled intermittent feeding of the veneer. The cutting operation is preferably combined with a spacing operation, wherein the strip elements are arranged at uniform spacings therebetween on a downstream conveyor means as indicated at 7. The following device 8 is adapted to determine which strips belong to type Sa and may be passed on without further processing, which strips belong to type Sb and at what location they have to be trimmed, and which strips belong to type Sc, having, for instance, no parallel edges, so that they are to be discarded. The scanning device 8 determines the respective properties in a per se known manner. The scanning results are stored in the form of control signals to be transmitted to a downstream transverse trimming device 9 comprising for instance a plurality of closely spaced, individually lowerable sawblades, circular knives or the like, or means for generating high-energy radiation. This device 9 may thus be employed to cut all of the non-usable material to pieces of the minimum size permitted by the grid pattern. In this case it would be advantageous to discharge all of the thus chopped material directly from the trimming and chopping device 9, as the further conveyance of the small pieces offers unnecessary complications. It is also possible, however, to actuate only those cutting or trimming elements of the trimming and chopping device which are required for trimming non-usable sections off usable strip sections, so that in the case of faulty strips Sc none of the cutting elements would be actuated. In this case, all strips are conveyed from trimming device 9 to a downstream sorting device 10, the operation of which would be controlled by scanning device 8.

After elimination of the non-usable rejects, there remain only veneer strips of equal width of types Sa and Sd. In the practical implementation of the method, the next step would in most cases be a quality grading operation, the illustration of which has been omitted in FIG. 5 for the sake of clarity. This quality grading may be carried out manually or by means of any type of known scanning and grading devices. The employ of suitably developed equipment would permit to combine this grading operation with the separation of the full-length strips Sa from the strip sections Sd indicated at 11 and 12, respectively, in FIG. 5.

Practical implementation of the method would now in most cases call for temporary storage of the quality-graded strips Sa and strip sections Sd. An illustration of this temporary storage has also been omitted in FIG. 5, which shows instead the immediately succeeding further processing of the strips and strip sections to form a veneer web 16, the length of which in the fiber direction is substantially greater than that of the starting veneer web 5. To this effect, the quality-graded strips Sa and strip sections Sd are fed to longitudinal joining devices 13, wherein they are longitudinally joined in a per se known manner to form a theoretically endless ribbon of uniform width, which is subsequently cut to lengths corresponding to the length of the final product. In this context, the invention offers the possibility to join the strips and strip sections by themselves or in combination with one another either at random or in accordance with a suitable system. The thus obtained ribbons may be stored or processed further immediately after the joining step. If the final-length strips have been formed separately of strips Sa and strip sections Sd, respectively, the veneer web 16 may be formed by employing strips composed of full-length strips Sa or strip sections Sd, respectively, separately or in any randomly chosen or predetermined combination, the latter system having been illustrated in FIG. 5.

The devices designated 14 each contain a supply of final-length strips composed of strips Sa and strip sections Sd, respectively, and are operable to feed the strips to a subjacent conveyor at random sequence. The conveyor feeds the final-length strips—optionally after a suitable treatment of the abutting edges, which may have been carried out by the longitudinal joining device 13 already—to a transverse joining device 15, wherein the strips are joined in a per se known manner to form the final veneer web 16, which may then be further processed or wound up as a continuous web, or may be cut by means of a transverse cutting device 17 to form veneer sheets of a desired width. The resulting final product in the form of veneer sheets 17 may then be collected on a veneer stack 18 as shown in the drawing.

All of the components of the apparatus described are automatically controlled by a control unit 19 connected by suitable wiring to the individual components.

The apparatus may of course also be designed in such a manner that the substantially faultless and thus practically fully usable veneer web shown in FIG. 1*b* is only cut to relatively wide sheets which may already have the full length of the final product.

FIG. 2 shows an example of a portion of a finished veneer web of predetermined length and width composed of final-length strips formed separately of full-length strips Sa and strip sections Sd, respectively, the final length being substantially greater than the length of the starting veneer web 5 as represented by strips Sa.

In a modification shown in FIG. 3, the final width of a finished veneer web in the fiber direction corresponds to the length of the full-length strips Sa. The shown veneer web or sheet is composed of full-length strips Sa and final-length strips formed of strip sections Sd.

FIG. 4 finally shows a further modification of the invention, in which a portion of a finished veneer web is composed of a large-width (in the present case: half-width) veneer sheet in combination with full-length strips Sa and final-length strips composed of strip sections Sd.

FIG. 6 shows the configuration of the abutting ends of two strips or strip sections Sa, Sd, respectively, designed for achieving an interlock engagement effective in the fiber direction. The transverse edge 20 of strip Sa is formed with rounded recesses 21 the interior width W1 of which is greater than the width W2 adjacent the transverse edge. the end of the strip section Sd to be joined is formed with projections 22 of a shape corresponding to that of recesses 21 and projecting beyond the transverse edge 23. As shown in FIG. 6, the end portions of the strips, or strip sections, respectively, to be joined are placed one above the other to align the projections 22 with the recesses 21, whereupon the two end portions are compressed in the direction of arrows 24, so that the projections are received in the recesses and retained therein against disengagement in the fiber direction. The strength of this connection may be further improved by the additional employ of an adhesive. The strips or strip sections may also be joined to one another as by sewing, stapling or by application of an adhesive strip.

The projections 22 and recesses 21 may be formed by die-cutting of a stack of the strips or strip sections.

I claim:

1. A method for producing a veneer web by joining individual veneer strips of limited length and width, said strips being cut from a raw veneer sheet in dependence on fault areas and quality variations thereof, comprising the steps of:

(a) dividing the raw veneer substantially parallel to the fiber direction into strips of equal width independently of the dimensions of the finished veneer web, (b) trimming the non-usable longitudinal sections of strips having partially unacceptable faults along their longitudinal extent for obtaining equal width strip sections of effectively usable length, (c) eliminating strips having no effectively usable sections as well as the non-usable sections trimmed off the usable strip sections, (d) joining the usable strip sections and any usable full length strips in their longitudinal direction for obtaining an endless strip, and dividing the same into strip lengths all of equal width, and (e) joining the thus obtained strips, all of equal width, transversely to their longitudinal direction for obtaining a veneer web.

2. A method according to claim 1, characterized in that the usable strips and the usable strip sections are combined to form separate groups of different quality.

3. A method according to claim 2, characterized in that the width of all strips and the minimum length of the faultless strip sections are selected in dependency of the typical fault characteristic of the specific type of wood.

4. A method according to one of claims 1 to 3, characterized in that veneer strips of equal width and varying length that have not been obtained from a homogeneous raw wood block are joined to form veneer strips of equal length which are then joined to form a veneer web of a desired width.

5. A method according to one of claims 1 to 3, characterized in that full-length usable veneer strips obtained from a raw wood block of sufficient length are combined with strips of equal length formed of longitudinally joined strip sections to form a veneer web of a desired width.

6. A method according to claim 1 including the step of drying said raw veneer before said raw veneer is divided substantially parallel to the fiber direction.

* * * * *